United States Patent
Hakola et al.

(10) Patent No.: US 11,133,908 B2
(45) Date of Patent: Sep. 28, 2021

(54) APPARATUS AND METHOD FOR PHYSICAL LAYER TRANSMISSION OF PAGING AND BROADCASTED SYSTEM INFORMATION

(71) Applicant: Nokia Technologies Oy, Espoo (FI)

(72) Inventors: Sami-Jukka Hakola, Kempele (FI); Timo Koskela, Oulu (FI); Jorma Johannes Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/969,001

(22) PCT Filed: Feb. 13, 2019

(86) PCT No.: PCT/IB2019/051169
§ 371 (c)(1),
(2) Date: Aug. 11, 2020

(87) PCT Pub. No.: WO2019/159079
PCT Pub. Date: Aug. 22, 2019

(65) Prior Publication Data
US 2021/0028901 A1    Jan. 28, 2021

Related U.S. Application Data

(60) Provisional application No. 62/710,439, filed on Feb. 16, 2018.

(51) Int. Cl.
*H04L 5/06*    (2006.01)
*H04L 5/00*    (2006.01)
(Continued)

(52) U.S. Cl.
CPC .......... *H04L 5/0048* (2013.01); *H04L 5/0094* (2013.01); *H04W 68/005* (2013.01); *H04W 72/14* (2013.01)

(58) Field of Classification Search
CPC ..... H04L 5/003; H04L 5/0044; H04L 5/0048; H04L 5/0053; H04L 5/0094;
(Continued)

(56) References Cited

U.S. PATENT DOCUMENTS 6,950,399 B1 *  9/2005  Bushmitch .......... H04L 12/2801
                                                      370/236
2010/0040001 A1 *  2/2010  Montojo ............. H04W 74/006
                                                      370/329
(Continued)

FOREIGN PATENT DOCUMENTS

| WO | 2010/053984 A2 | 5/2010 |
| WO | 2018/106043 A1 | 6/2018 |
| WO | 2018/128427 A1 | 7/2018 |

OTHER PUBLICATIONS

"3rd Generation Partnership Project; Technical Specification Group Radio Access Network; NR; Physical layer procedures for control (Release 15)", 3GPP TA 38.213, V15.0.0, Dec. 2017, pp. 1-56.
(Continued)

*Primary Examiner* — Siu M Lee
(74) *Attorney, Agent, or Firm* — Nokia Technologies Oy

(57) ABSTRACT

One embodiment is directed to a method comprising generating information related to resource which can be used for allocating a data transmission; transmitting the information to a user equipment, and sending the data transmission within the resource. In some embodiments, the resource is a frequency domain resource and the information indicates whether the resource comprises a RMSI CORESET bandwidth or a RMSI CORESET bandwidth and a SS/PBCH block frequency allocation.

11 Claims, 7 Drawing Sheets

(51) Int. Cl.
*H04W 68/00* (2009.01)
*H04W 72/14* (2009.01)

(58) Field of Classification Search
CPC .. H04L 5/0096; H04L 5/0098; H04W 68/005; H04W 72/14; H04W 72/0453
See application file for complete search history.

(56) References Cited

U.S. PATENT DOCUMENTS

| | | | |
|---|---|---|---|
| 2018/0049203 A1* | 2/2018 | Xue | H04L 5/0053 |
| 2019/0132170 A1* | 5/2019 | Si | H04L 27/266 |
| 2019/0158205 A1* | 5/2019 | Sheng | H04L 5/0048 |
| 2019/0223163 A1* | 7/2019 | Ko | H04W 72/042 |
| 2020/0092946 A1* | 3/2020 | Xiong | H04L 1/0071 |
| 2020/0266959 A1* | 8/2020 | Yi | H04W 74/0833 |
| 2020/0359384 A1* | 11/2020 | Da | H04W 72/005 |

OTHER PUBLICATIONS

"3rd Generation Partnership Project; Technical Specification Group Radio Access Network; NR; Physical layer procedures for data (Release 15)", 3GPP TS 38.214, V15.0.0, Dec. 2017, pp. 1-71.
International Search Report and Written Opinion received for corresponding Patent Cooperation Treaty Application No. PCT/IB2019/051169, dated May 31, 2019, 13 pages.

\* cited by examiner

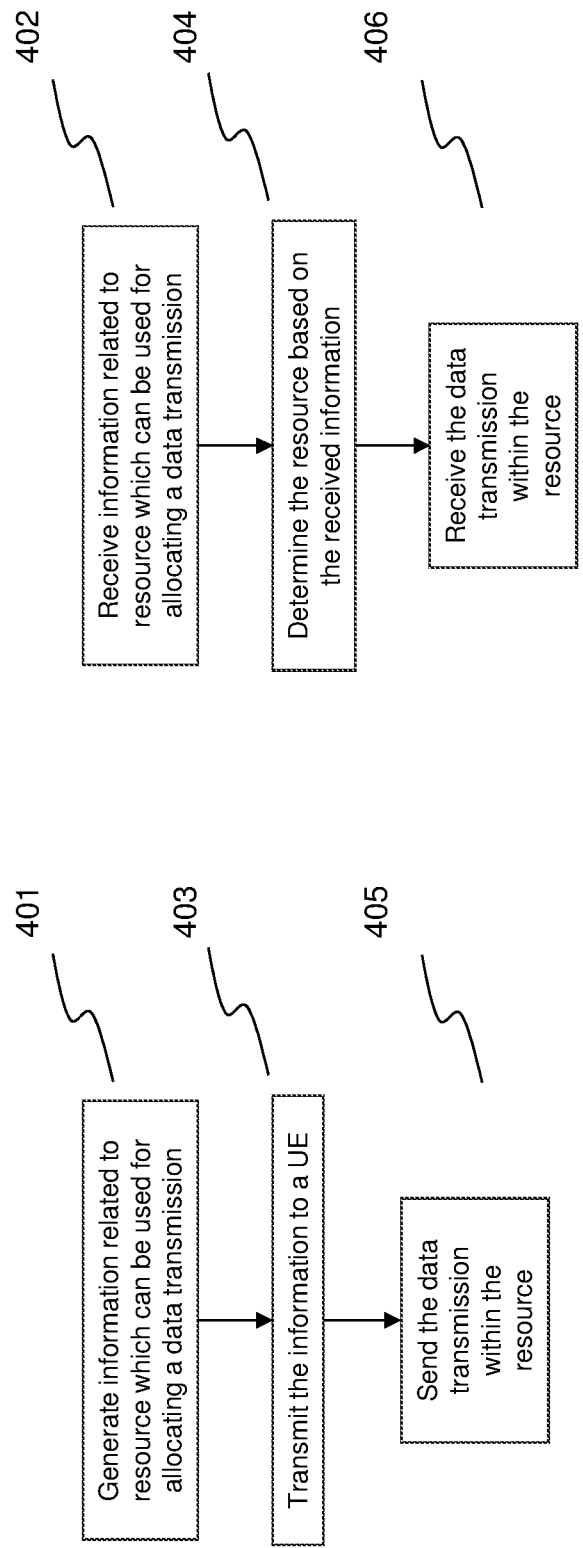

APPARATUS AND METHOD FOR PHYSICAL LAYER TRANSMISSION OF PAGING AND BROADCASTED SYSTEM INFORMATION

RELATED APPLICATION

This application was originally filed as Patent Cooperation Treaty Application No. PCT/IB2019/051169 filed on Feb. 13, 2019, which claims priority from U.S. Provisional Patent Application No. 62/710,439, filed on Feb. 16, 2018, which is hereby incorporated in its entirety.

CROSS-REFERENCE TO RELATED APPLICATIONS

This application claims priority to U.S. Provisional Patent Application No. 62/710,439 filed on Feb. 16, 2018. The entire content of the above-referenced application is hereby incorporated by reference.

TECHNICAL FIELD

Some example embodiments may relate generally to an apparatus and a method for physical layer transmission of paging and broadcasted system information.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application.

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or fifth generation (5G) radio access technology or new radio (NR) access technology. 5G or NR wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One example embodiment is directed to a method, which may include generating information related to resource which can be used for allocating a data transmission; transmitting the information to a user equipment; and sending the data transmission within the resource, wherein the resource is a frequency domain resource and the information indicates whether the resource comprises a first bandwidth or a first bandwidth and a second bandwidth.

Another example embodiment is directed to an apparatus, which may include at least one processor, and at least one memory including computer program code. The at least one memory and the computer program code are configured, with the at least one processor, to cause the apparatus at least to generate information related to resource which can be used for allocating a data transmission; transmit the information to a user equipment; and send the data transmission within the resource, wherein the resource is a frequency domain resource and the information indicates whether the resource comprises a first bandwidth or a first bandwidth and a second bandwidth.

Another example embodiment is directed to an apparatus, which may include means for generating information related to resource which can be used for allocating a data transmission; means for transmitting the information to a user equipment; and means for sending the data transmission within the resource, wherein the resource is a frequency domain resource and the information indicates whether the resource comprises a first bandwidth or a first bandwidth and a second bandwidth.

Another example embodiment is directed to a method, which may include receiving information related to resource which can be used for allocating a data transmission; determining the resource based on the received information; and receiving the data transmission within the resource, wherein the resource is a frequency domain resource and the information indicates whether the resource comprises a first bandwidth or a first bandwidth and a second bandwidth.

Another example embodiment is directed to an apparatus, which may include at least one processor, and at least one memory including computer program code. The at least one memory and the computer program code are configured, with the at least one processor, to cause the apparatus at least to receive information related to resource which can be used for allocating a data transmission; determine the resource based on the received information; and receive the data transmission within the resource, wherein the resource is a frequency domain resource and the information indicates whether the resource comprises a first bandwidth or a first bandwidth and a second bandwidth.

Another example embodiment is directed to an apparatus, which may include means for receiving information related to resource which can be used for allocating a data transmission; means for determining the resource based on the received information; and means for receiving the data transmission within the resource, wherein the resource is a frequency domain resource and the information indicates whether the resource comprises a first bandwidth or a first bandwidth and a second bandwidth.

BRIEF DESCRIPTION OF THE DRAWINGS

For a more complete understanding of example embodiments of the present invention, reference is now made to the following descriptions taken in connection with the accompanying drawings in which:

FIGS. 4a and 4b illustrate flowcharts in accordance with example embodiments of the application.

DETAILED DESCRIPTION

The description below generally refers to 5G NR terms, however this is not intended to be limiting. The description is equally applicable to other wireless networks and technologies. It will be also readily understood that the components of certain example embodiments, as generally described and illustrated in the figures herein, may be arranged and designed in a wide variety of different configurations. Thus, the following detailed description of some example embodiments of systems, methods, apparatuses, and computer program products for physical layer transmission of paging and broadcasted system information, as represented in the attached figures and described below, is not intended to limit the scope of certain embodiments but is representative of selected example embodiments.

The features, structures, or characteristics of example embodiments described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in an example embodiment," "in some embodiments," "in other embodiments," or other similar language, throughout this specification do not necessarily all refer to the same group of embodiments, and the described features, structures, or characteristics may be combined in any suitable manner in one or more embodiments.

In NR, there are three multiplexing options for synchronization signal (SS)/physical broadcast channel (PBCH) block and remaining minimum system information (RMSI) transmission. In an example embodiment, a physical downlink control channel (PDCCH) for scheduling of physical downlink shared channel (PDSCH) carrying RMSI information may be transmitted and followed by the transmission of the corresponding PDSCH. These different options, called multiplexing patterns, are illustrated in FIG. 1.

Figure 1:
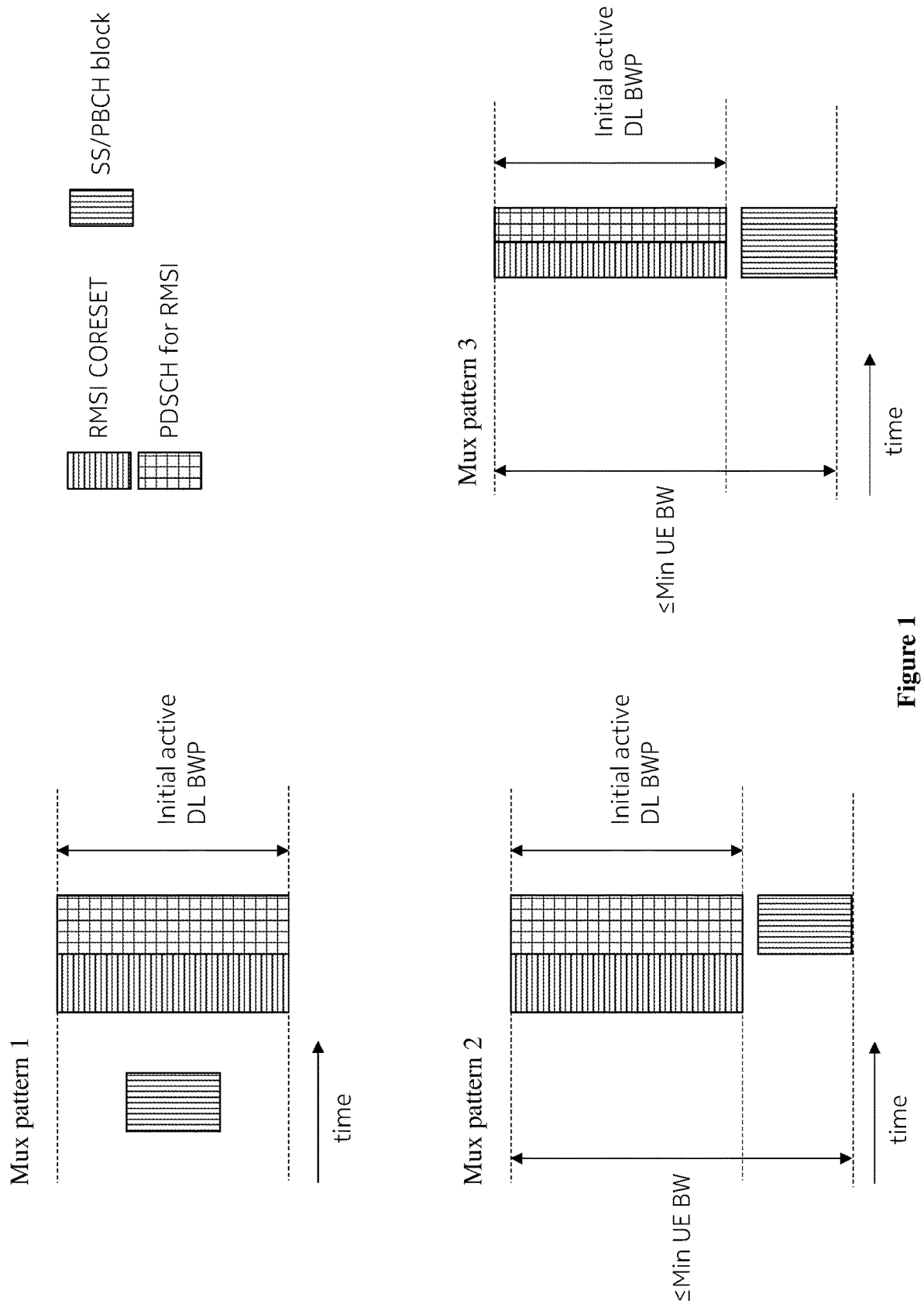
FIG. 1 illustrates multiplexing patterns between remaining minimum system information transmission and synchronization signal/physical broadcast channel.
Figure 2A:
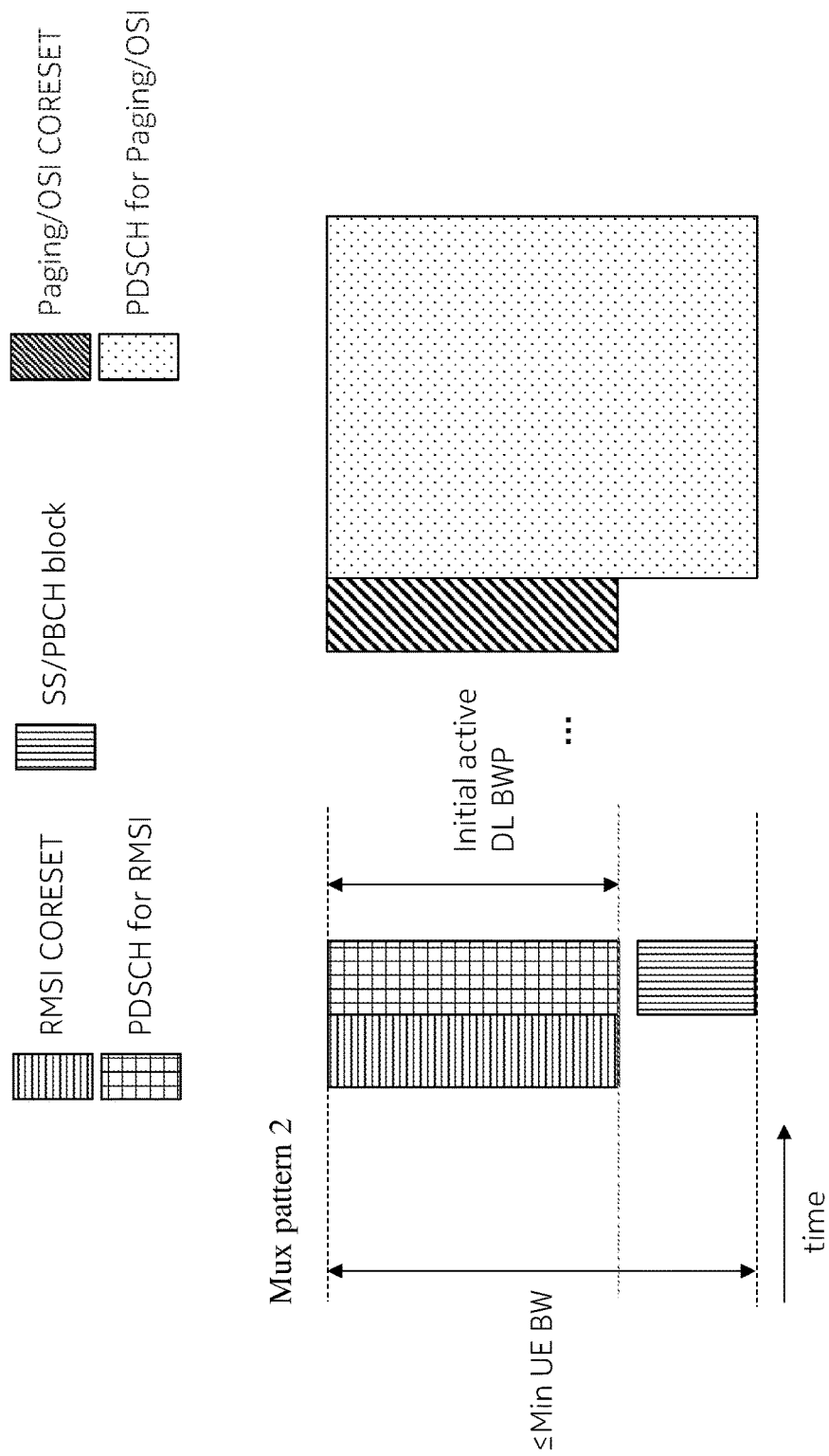
FIGS. 2(a), 2(b), 3(a) and 3(b) illustrate channel structure for multiplex pattern 2 and 3, respectively, in accordance with various example embodiments.
Figure 2B:
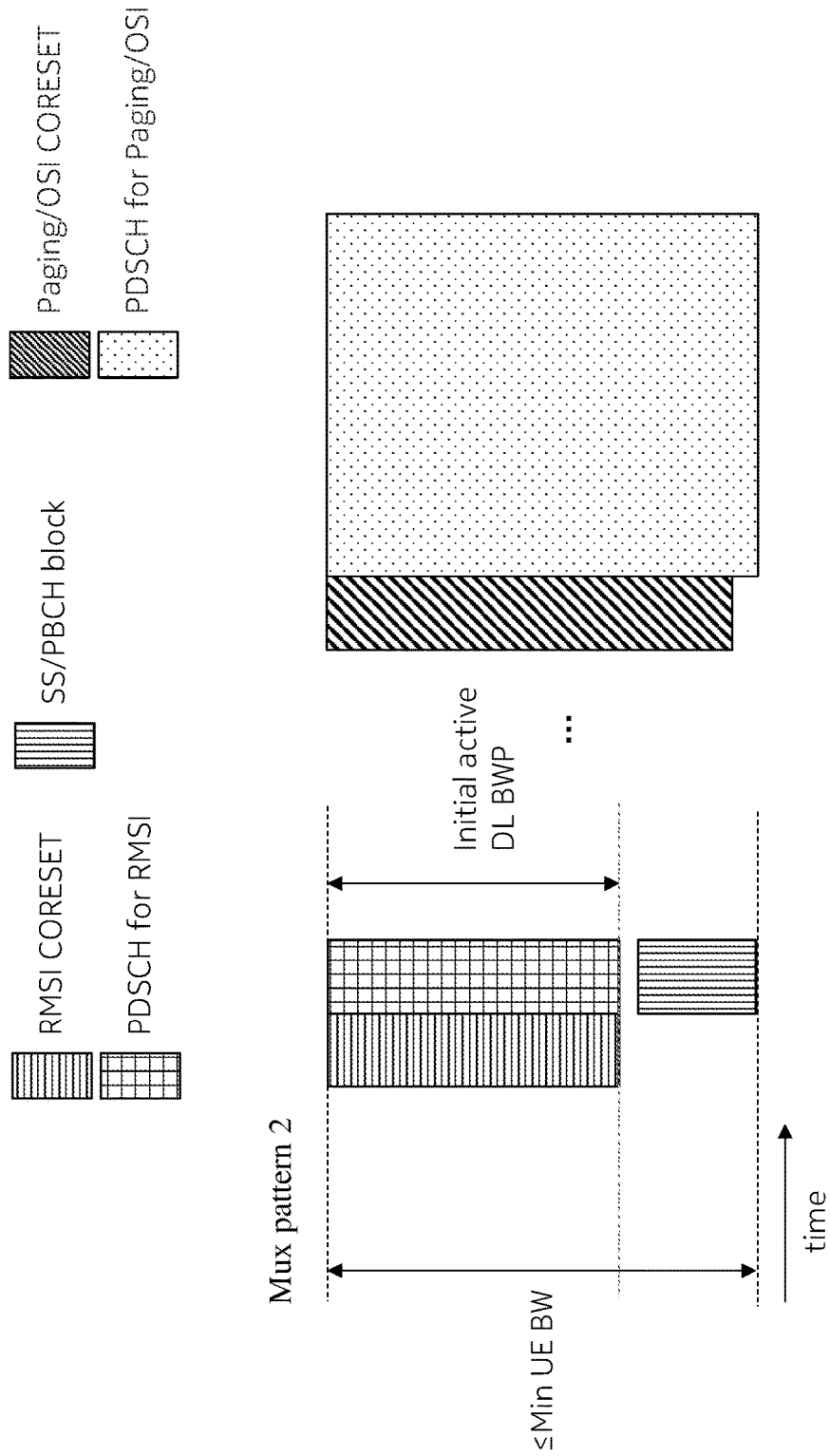
Figure 3A:
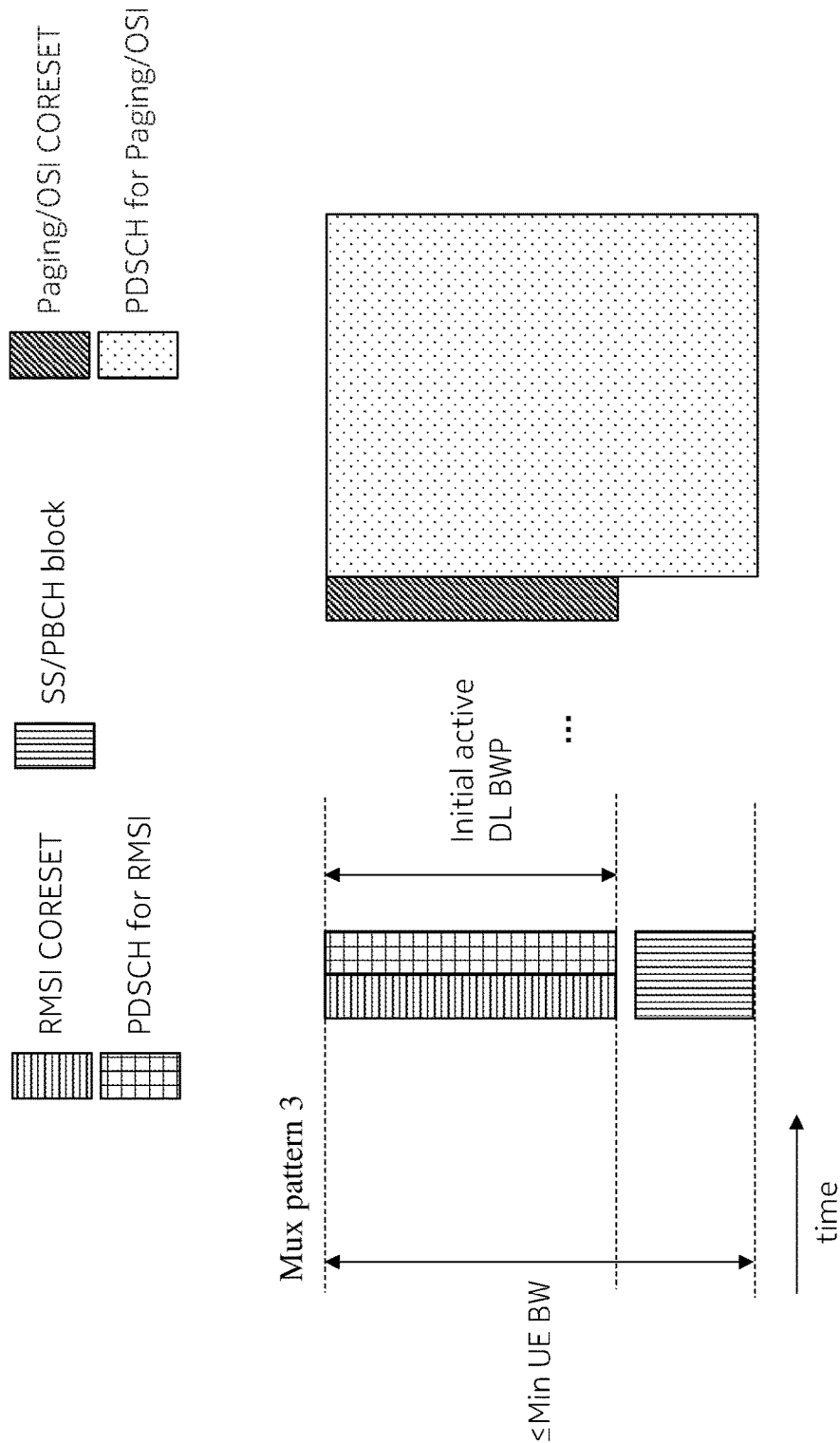
Figure 3B:
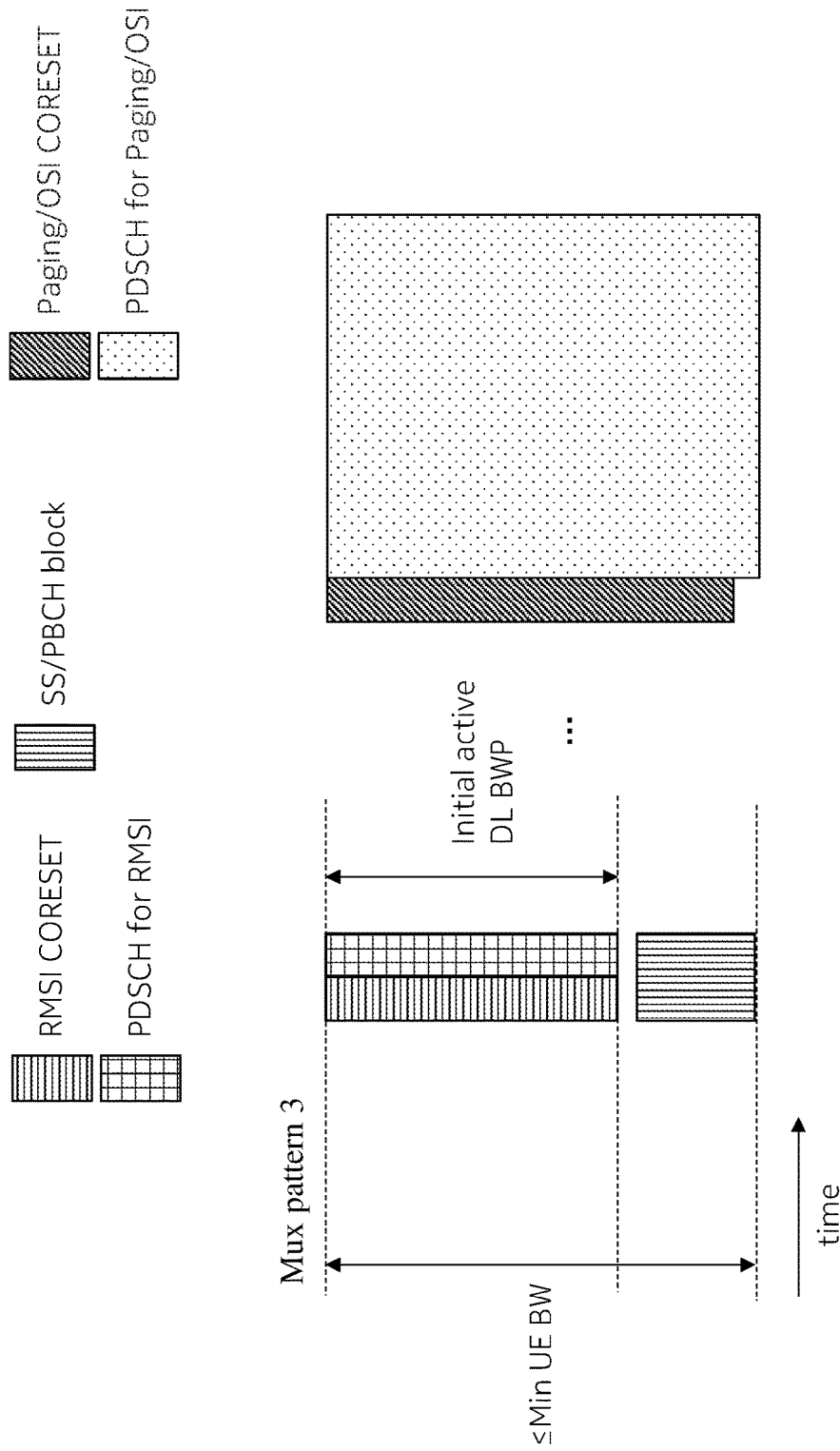

In an example embodiment of FIG. 1, RMSI control resource set (CORESET), i.e. physical time and frequency resources where PDCCH for scheduling PDSCH carrying RMSI can be transmitted, defines initial active bandwidth part (BWP) which is the frequency region where the PDSCH for RMSI is transmitted. The initial BWP also defines where PDCCH for scheduling PDSCH carrying paging and other system information (OSI) is transmitted in the cell. With SS/PBCH block and RMSI CORESET multiplexing patterns 2 and 3, a user equipment (UE) may support a bandwidth comprising both initial active BWP defined by RMSI CORESET and SS/PBCH block. Note that there may be some space between SS/PBCH and RMSI CORESET.

In an example embodiment of FIG. 1, multiplexing pattern 2 and 3 may be designed for higher carrier frequencies where gNBs typically exploit analog beamforming architectures. Efficient transmission schemes at higher carrier frequencies where gNBs are typically using analog beamforming architectures are short in time domain because frequency domain multiplexing within a limited number of available beams (e.g. only one at a time) is challenging. Moreover, the broadcasted transmissions are expensive because the same information needs to be transmitted via multiple beams multiplexed in time domain to cover the whole cell/sector. Thus, a design is needed to enable as wide transmission in frequency as possible to minimize the duration in time domain e.g. for paging or/and broadcasted OSI transmissions.

In an example embodiment, RMSI may inform UE of bandwidth for paging or/and OSI reception. The bandwidth may comprise RMSI CORESET bandwidth, or comprise RMSI CORESET bandwidth and SS/PBCH allocation. A resource indexing, such as for example, a physical resource block (PRB) indexing for PDSCH allocation for paging or/and OSI starts from the lower edge of the RMSI CORESET if the RMSI CORESET is lower in frequency than the SS/PBCH block or from the lower edge of the SS/PBCH block if the SS/PBCH block is lower in frequency than the RMSI CORESET, where the lower edge of the SS/PBCH block refers to the lowest PRB on the common PRB grid determined by the subcarrier offset indicated by a higher-layer parameter such as for example ssb-subcarrierOffset.

In an example embodiment the RMSI informing paging or/and OSI reception bandwidth may also affect the CORESET configuration for paging or/and OSI in a such a manner that the start of the resource indexing for the paging or/and OSI CORESET corresponds, as for example, to the lower edge of the RMSI CORESET if the RMSI CORESET is lower in frequency than the SS/PBCH block or from the lower edge of the SS/PBCH block if the SS/PBCH block is lower in frequency than the RMSI CORESET, where the lower edge of the SS/PBCH block refers to the lowest PRB on the common PRB grid determined by the subcarrier offset indicated by a higher-layer parameter such as for example ssb-subcarrierOffset. In addition, the paging or/and OSI CORESET bandwidth in number of PRBs may comprise RMSI CORESET bandwidth, or comprise RMSI CORESET bandwidth and SS/PBCH allocation. In an example embodiment, since the actual number of PRBs of the paging or/and OSI CORESET is determined as integer number of resource element group (REG), while a REG may comprise multiple PRBs, it may or may not be same as that of the PDSCH carrying the paging or/and OSI information.

In an example embodiment, a gNB may transmit information in RMSI related to frequency domain resources which can be used for allocating PDSCH carrying paging or/and OSI. The information may indicate whether PDSCH allocation is within RMSI CORESET bandwidth or within bandwidth comprising RMSI CORESET bandwidth and SS/PBCH block frequency allocation. As an example, the information may be a one-bit indicator. In an example embodiment, the information may also indicate whether the bandwidth of PDCCH scheduling PDSCH carrying paging or/and OSI is same as RMSI CORESET bandwidth or extended.

In an example embodiment, a gNB may transmit PDSCH for paging or/and OSI within the bandwidth indicated in RMSI as described above. In PDCCH scheduling the PDSCH carrying paging or/and OSI, the gNB uses PRB indices where PRB #0 is the lower edge of the RMSI CORESET if the RMSI CORESET is lower in frequency than the SS/PBCH block or the lower edge of the SS/PBCH block if the SS/PBCH block is lower in frequency than the RMSI CORESET, where the lower edge of the SS/PBCH block refers to the lowest PRB on the common PRB grid determined by the subcarrier offset indicated by a higher-layer parameter such as for example ssb-subcarrierOffset.

FIGS. 2(a), 2(b), 3(a) and 3(b) illustrate channel structures for multiplex pattern 2 and 3, respectively, in accordance with various example embodiments, where the CORESET of PDCCH scheduling the PDSCH carrying paging or/and OSI is denoted as Paging/OSI CORESET.

In an example embodiment, a UE may determine from the RMSI whether PDSCH allocation for paging or/and OSI is within RMSI CORESET bandwidth or within bandwidth comprising RMSI CORESET and SS/PBCH block frequency allocation.

In an example embodiment, a UE may determine the PRB indexing carried in PDCCH for scheduling paging or/and OSI so that PRB #0 is the lower edge of the RMSI CORESET if the RMSI CORESET is lower in frequency than the SS/PBCH block or the lower edge of the SS/PBCH block if the SS/PBCH block is lower in frequency than the RMSI CORESET. The UE may also determine the size of the downlink grant for paging or/and OSI scheduling based on the configured bandwidth as described herein.

In an example embodiment, the default initial BWP may be defined to comprise both RMSI CORESET bandwidth and SS/PBCH allocation for RMSI CORESET multiplexing patterns 2 and 3. This may be specified in standard or configured in a signaling message.

FIG. 4a illustrates a flowchart in accordance with an example embodiment. In the example of FIG. 4a, a network element (NE) such as for example, a base station, a gNB, or any other access node, may generate information related to resource which can be used for allocating a data transmission at step 401. In an example embodiment, the resource is a frequency domain resource and the generated information indicates whether the frequency domain resource comprises a first frequency bandwidth, or a first frequency bandwidth and a second frequency bandwidth. More specifically, in an example embodiment, the first frequency bandwidth is a RMSI CORESET bandwidth and the second frequency bandwidth is a SS/PBCH block frequency allocation. At step 403, the NE may transmit the generated information to a UE. In an example embodiment, the generated information may be a one-bit indicator. The NE may send the data transmission within the resource at step 405. In an example embodiment, the data transmission may carry paging information or/and OSI.

FIG. 4b illustrates a flowchart in accordance with an example embodiment. In the example of FIG. 4b, a UE may receive information related to resource which can be used for allocating a data transmission at step 402. In an example embodiment, the resource is a frequency domain resource and the generated information indicates whether the frequency domain resource comprises a first frequency bandwidth, or a first frequency bandwidth and a second frequency bandwidth. More specifically, in an example embodiment, the first frequency bandwidth is a RMSI CORESET bandwidth and the second frequency bandwidth is a SS/PBCH block frequency allocation. In an example embodiment, the generated information may be a one-bit indicator. At step 404, the UE may determine the resource based on the received information. The UE then may receive the data transmission within the resource at step 406. In an example embodiment, the data transmission may carry paging information or/and OSI.

Figure 5:
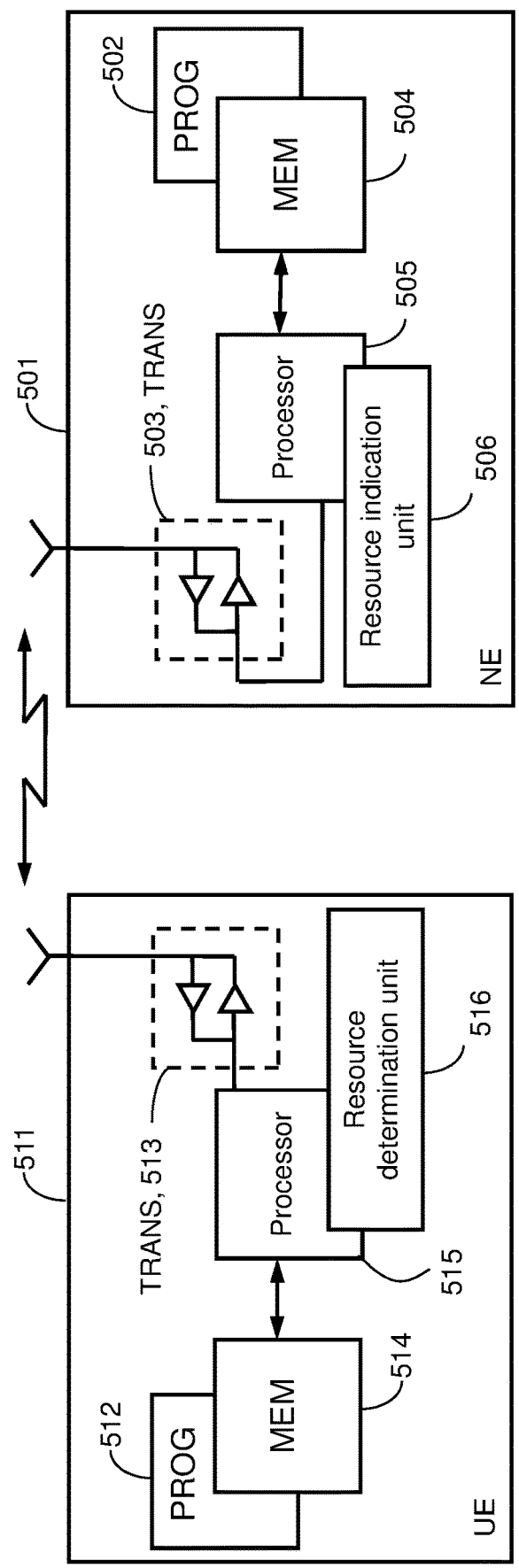
FIG. 5 illustrates a simplified block diagram of example apparatuses that are suitable for use in practicing various example embodiments of this application.

Reference is made to FIG. 5 for illustrating a simplified block diagram of various example apparatuses that are suitable for use in practicing various example embodiments of this application. In FIG. 5, a network element (NE) 501 may be a node, host, or server in a communications network or serving such a network. For example, NE 501 may be a base station, a Node B, an evolved Node B (eNB), 5G Node B or access point, next generation Node B (NG-NB or gNB), wireless local area network (WLAN) access point, mobility management entity (MME), and/or subscription server associated with a radio access network, such as a global system for mobile communication (GSM) network, LTE network, 5G or NR. The NE 501 is adapted for communication with UE 511.

It should be understood that in some example embodiments, NE 501 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that NE 501 may include components or features not shown in FIG. 5.

As illustrated in the example of FIG. 5, the NE 501 may include at least one processor circuitry 505, at least one memory (MEM) 504 coupled to the at least one processor circuitry 505, and a suitable transceiver (TRANS) 503 (having a transmitter (TX) and a receiver (RX)) coupled to the at least one processor circuitry 505. The at least one MEM 504 stores a program (PROG) 502. The TRANS 503 is for bidirectional wireless communications with the UE 511. The NE 501 may be coupled to one or more other NE, which is not shown in this figure.

As shown in FIG. 5, the NE 501 may further include a resource indication unit 506. The unit 506, together with the at least one processor circuitry 505 and the PROG 502, may be utilized by the NE 501 in conjunction with various example embodiments of the application, as described herein.

As shown in FIG. 5, the UE 511 includes at least one processor circuitry 515, at least one memory (MEM) 514 coupled to the at least one processor circuitry 515, and a suitable transceiver (TRANS) 513 (having a transmitter (TX) and a receiver (RX)) coupled to the at least one processor circuitry 515. The at least one MEM 514 stores a program (PROG) 512. The TRANS 513 is for bidirectional wireless communications with the NE 501.

The UE 511 may further include a resource determination unit 516. The unit 516, together with the at least one processor circuitry 515 and the PROG 512, may be utilized by the UE 511 in conjunction with various example embodiments of the application, as described herein.

In general, the various example embodiments of the apparatus 511 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

In some example embodiments, the UE 511 may include one or more processors, one or more computer-readable storage medium (for example, memory, storage, or the like), one or more radio access components (for example, a modem, a transceiver, or the like), and/or a user interface. In some embodiments, the UE 511 may be configured to operate using one or more radio access technologies, such as GSM, LTE, LTE-A, NR, 5G, WLAN, narrow band IoT, Bluetooth, near field communication (NFC), MulteFire, and/or any other radio access technologies. It should be noted that one of ordinary skill in the art would understand that UE 511 may include components or features not shown in FIG. 5, such as for example, an input and/or output device (I/O device), or a user interface, such as a graphical user interface or touchscreen.

At least one of the PROGs 502 and 512 is assumed to include program instructions that, when executed by the associated processor, enable the electronic apparatus to operate in accordance with the example embodiments of this disclosure, as discussed herein.

The example embodiments of this disclosure may be implemented by computer software or computer program code executable by one or more of the processor circuitries 505, 515 of the NE 501 and the UE 511, or by hardware, or by a combination of software and hardware.

The MEMs 504 and 514 may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The processor circuitries 505 and 515 may be of any type suitable to the local technical environment, and may include one or more of general purpose computers, special purpose computers, microprocessors, digital signal processors (DSPs) and processors based on multi-core processor architecture, as non-limiting examples.

Without in any way limiting the scope, interpretation, or application of the claims appearing below, a technical effect of one or more of the example embodiments disclosed herein may be more efficient paging or/and OSI transmission especially when analog beamforming architectures are used where signals are transmitted in time division multiplexing manner to different directions. In that case to minimize system overhead the common control transmissions like paging or/and OSI should be short in time. That can be achieved if transmissions are wide in frequency.

Embodiments of the present invention may be implemented in software, hardware, application logic or a combination of software, hardware and application logic. The software, application logic and/or hardware may reside on an apparatus such as a user equipment, a gNB or other mobile communication devices. If desired, part of the software, application logic and/or hardware may reside on a network element 501, part of the software, application logic and/or hardware may reside on a UE 511, and part of the software, application logic and/or hardware may reside on other chipset or integrated circuit. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A

We claim:

1. A method, comprising:
   receiving information related to resource which can be used for allocating a data transmission;
   determining the resource based on the received information;
   and receiving the data transmission within the resource,
   wherein the resource is a frequency domain resource and the information indicates whether the resource comprises a first bandwidth or the first bandwidth and a second bandwidth, and wherein when the resource comprises the first bandwidth and the second bandwidth, in a control channel scheduling the data transmission, a resource block index is used where a first resource block is the lower edge of the first bandwidth if the first bandwidth is lower in frequency than the second bandwidth or the lower edge of the second bandwidth if the second bandwidth is lower in frequency than the first bandwidth.

2. The method of claim 1, wherein the first bandwidth is a remaining minimum system information control resource set bandwidth and the second bandwidth is a synchronization signal/physical broadcast channel block frequency allocation.

3. The method of claim 1, wherein the data transmission carries paging information or/and other system information.

4. The method of claim 1, further comprising:
   determining a size of a downlink grant for scheduling of the data transmission based on the indicated bandwidth.

5. An apparatus, comprising:
   at least one processor; and
   at least one memory comprising computer program code,
   wherein the at least one memory and the computer program code are configured, with the at least one processor, to cause the apparatus at least to:
   generate information related to resource which can be used for allocating a data transmission;
   transmit the information to a user equipment; and
   send the data transmission within the resource,
   wherein the resource is a frequency domain resource and the information indicates whether the resource comprises a first bandwidth or the first bandwidth and a second bandwidth, and wherein when the resource comprises the first bandwidth and the second bandwidth, in a control channel scheduling the data transmission, a resource block index is used where a first resource block is the lower edge of the first bandwidth if the first bandwidth is lower in frequency than the second bandwidth or the lower edge of the second bandwidth if the second bandwidth is lower in frequency than the first bandwidth.

6. The apparatus of claim 5, wherein the first bandwidth is a remaining minimum system information control resource set bandwidth and the second bandwidth is a synchronization signal/physical broadcast channel block frequency allocation.

7. The apparatus of claim 5, wherein the data transmission carries paging information or/and other system information.

8. An apparatus, comprising:
   at least one processor; and
   at least one memory comprising computer program code,
   wherein the at least one memory and the computer program code are configured, with the at least one processor, to cause the apparatus at least to:
   receive information related to resource which can be used for allocating a data transmission;
   determine the resource based on the received information; and
   receive the data transmission within the resource,
   wherein the resource is a frequency domain resource and the information indicates whether the resource comprises a first bandwidth or the first bandwidth and a second bandwidth, and wherein when the resource comprises the first bandwidth and the second bandwidth, in a control channel scheduling the data transmission, a resource block index is used where a first resource block is the lower edge of the first bandwidth if the first bandwidth is lower in frequency than the second bandwidth or the lower edge of the second bandwidth if the second bandwidth is lower in frequency than the first bandwidth.

9. The apparatus of claim 8, wherein the first bandwidth is a remaining minimum system information control resource set bandwidth and the second bandwidth is a synchronization signal/physical broadcast channel block frequency allocation.

10. The apparatus of claim 8, wherein the data transmission carries paging information or/and other system information.

11. The apparatus of claim 8, wherein the at least one memory and the computer program code are configured, with the at least one processor, to cause the apparatus further to:

determine a size of a downlink grant for scheduling of the data transmission based on the indicated bandwidth.

\* \* \* \* \*